March 13, 1962 W. C. BELK 3,024,890
ARTICLE HANDLING APPARATUS
Filed May 19, 1958 5 Sheets-Sheet 5
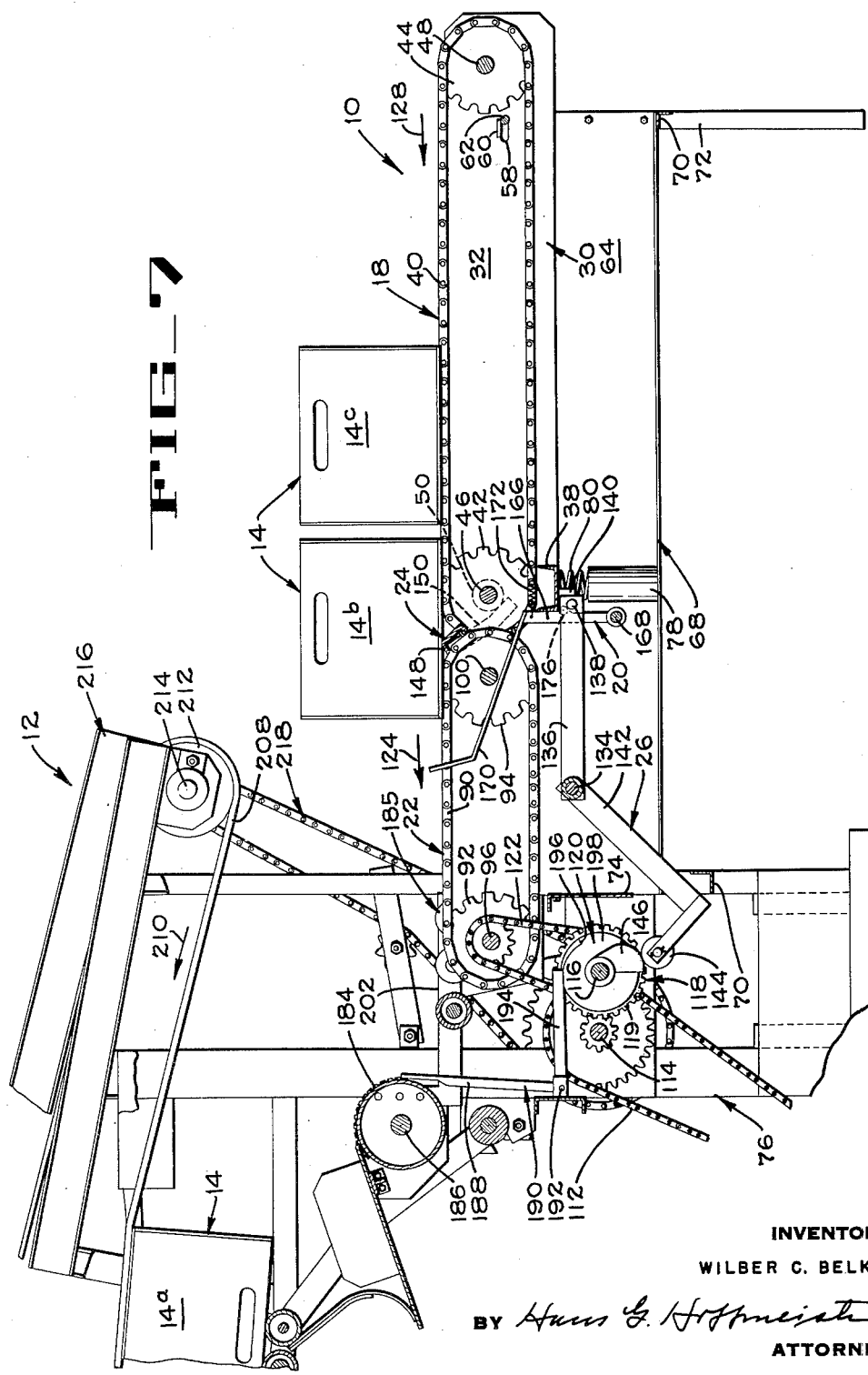
FIG_7
INVENTOR
WILBER C. BELK
BY Hans G. Hoffmeister
ATTORNEY

United States Patent Office 3,024,890
Patented Mar. 13, 1962

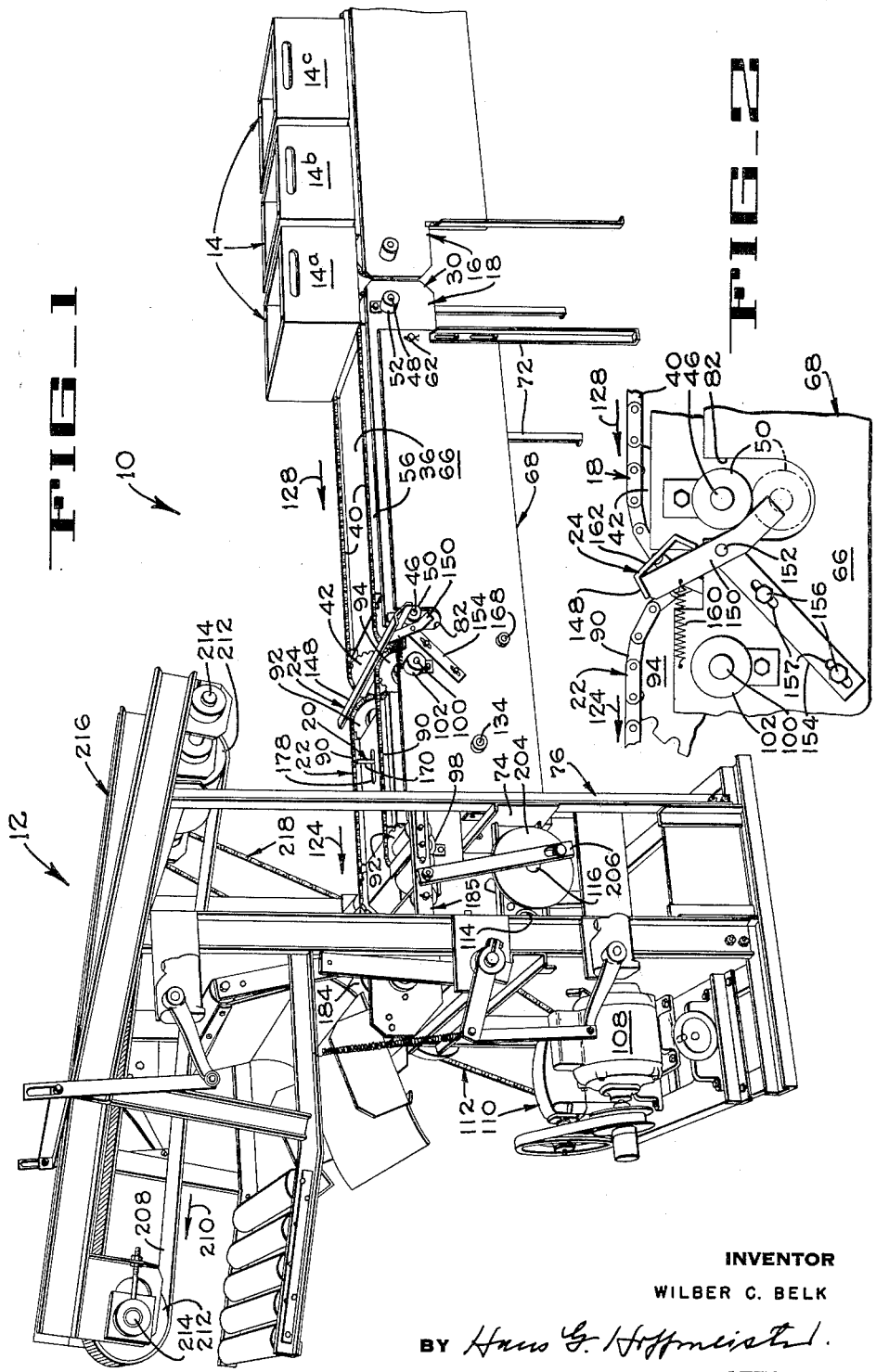

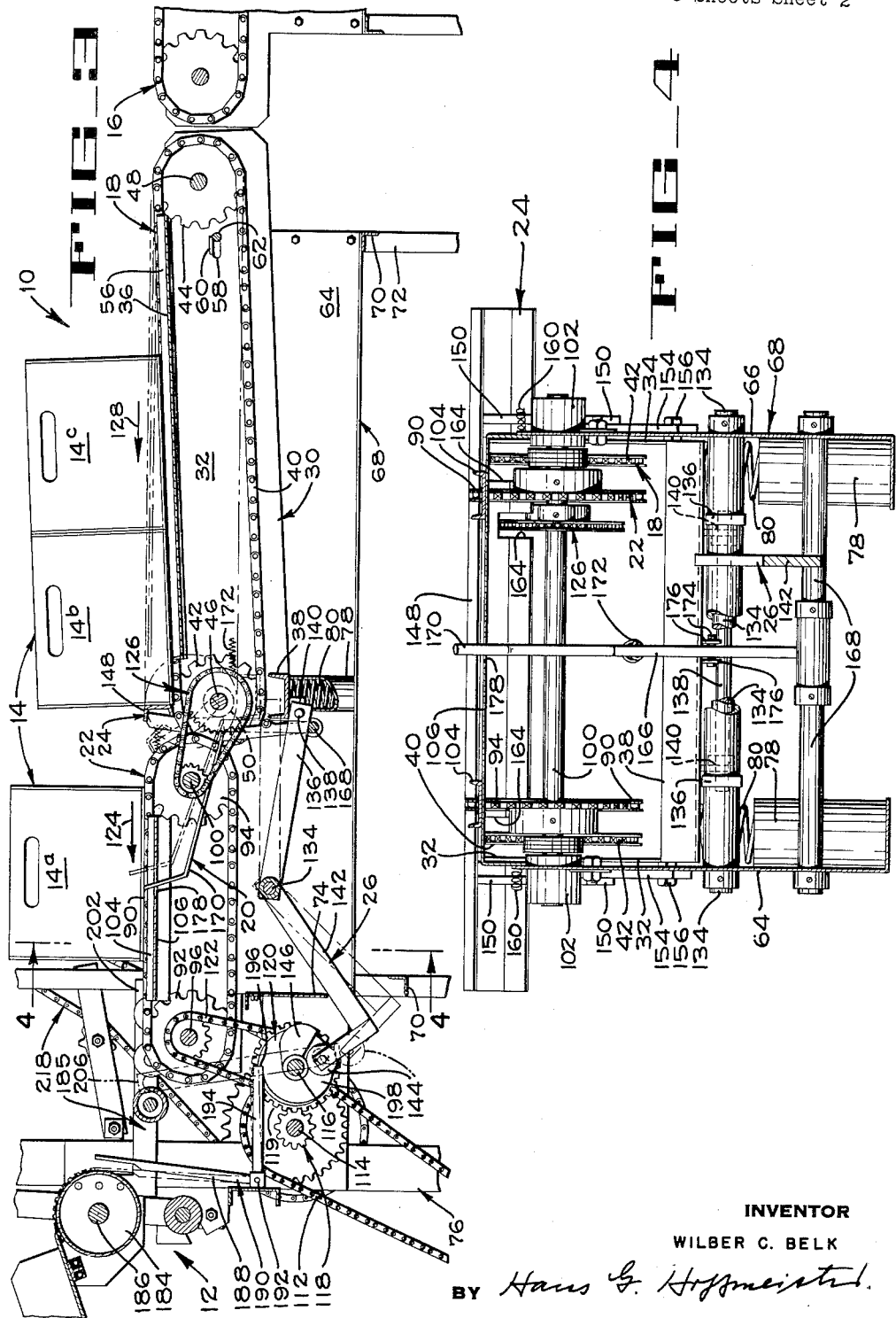

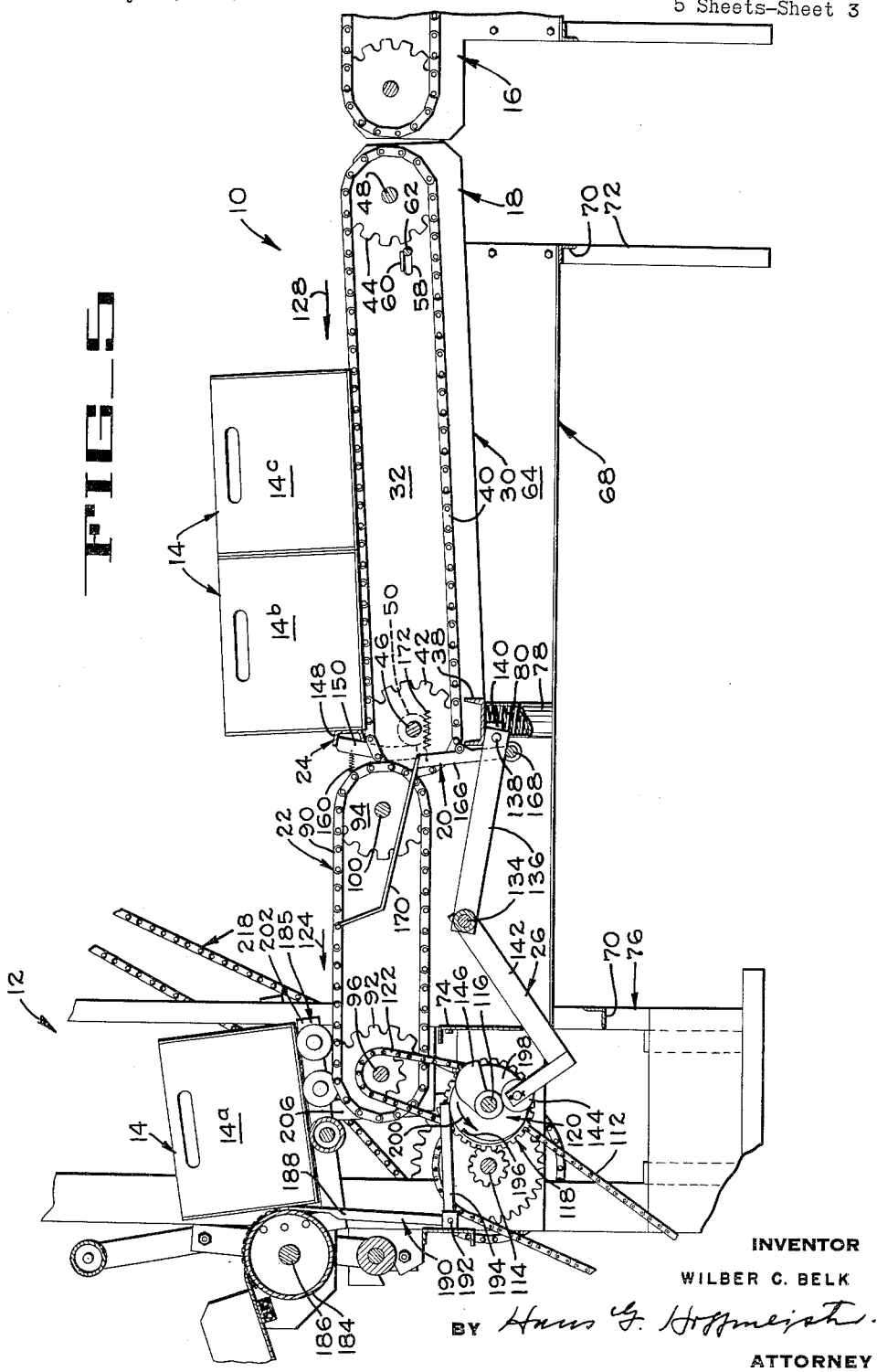

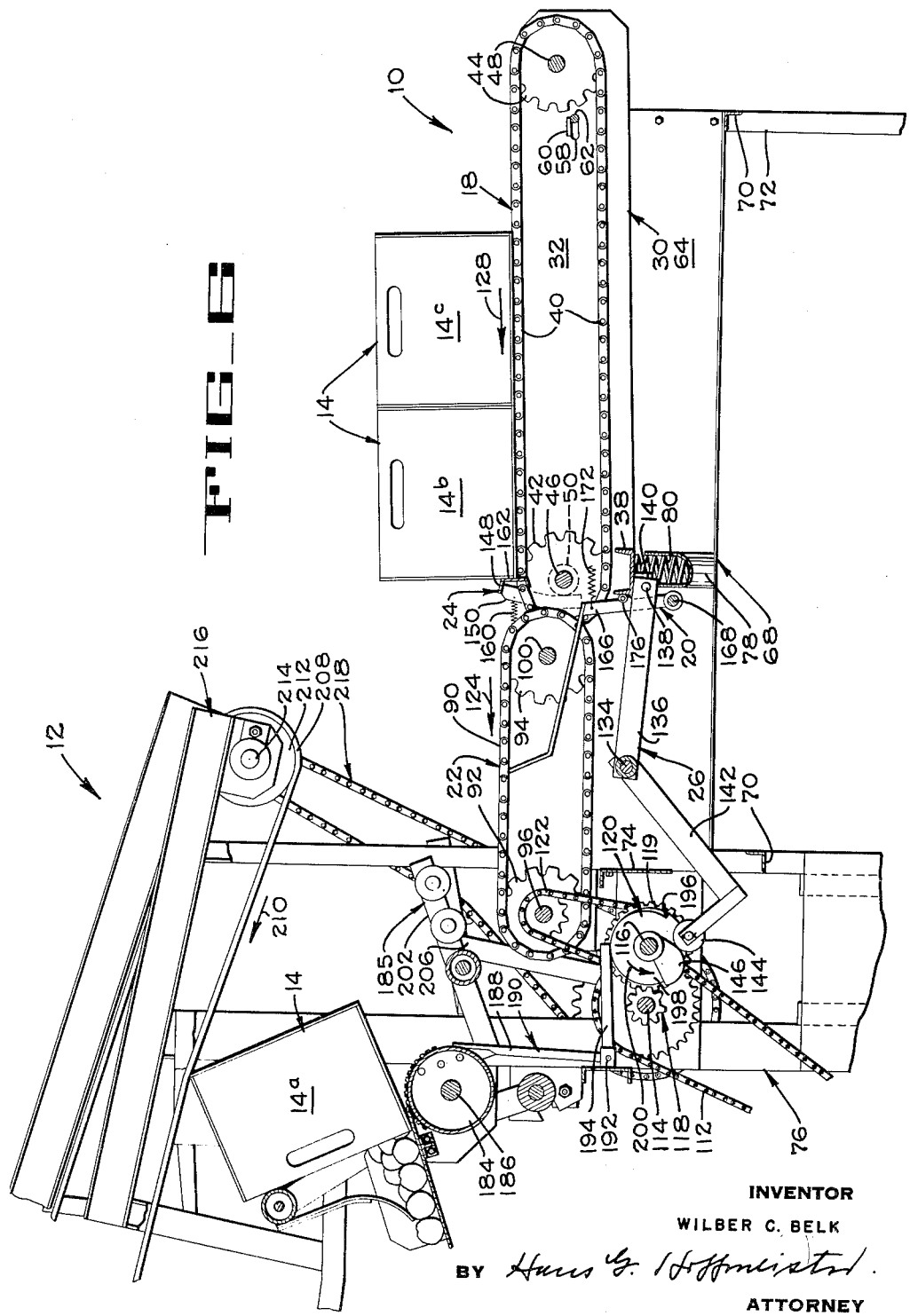

3,024,890
ARTICLE HANDLING APPARATUS
Wilber C. Belk, Lakeland, Fla., assignor to FMC Corporation, a corporation of Delaware
Filed May 19, 1958, Ser. No. 736,145
18 Claims. (Cl. 198—34)

The present invention appertains generally to article handling apparatus and more particularly to article accumulators of the type having a positive article stop.

Article accumulators are frequently used in conjunction with any of various pieces of processing equipment, e.g., box dumpers, to retain a plurality of articles in readiness for individual handling by the processing apparatus. If the processing apparatus receives the articles more slowly than they arrive in an associated accumulator of a type not having a positive stop, the build up of articles in the accumulator is apt to cause the processing apparatus to operate improperly.

An object of the invention is to provide an improved article accumulator.

Another object of the present invention is to provide an improved article accumulator that avoids causing processing apparatus supplied therefrom to be improperly operated in response to accumulation of a number of articles in the accumulator.

Another object is to provide an accumulator in which articles such as boxes are positively prevented from moving therepast until released for such movement.

Another object is to provide an article accumulator in which the presence of one or more articles therein is effective to prevent their untimely advancement past the accumulator.

Another object is to provide an article accumulator which is arranged to release articles retained therein for movement thereby in timed relation to the demand of an associated machine by which the article accumulator is controlled.

These and other objects and advantages of the present invention as well as the manner in which it is employed will become apparent from the following description and the accompanying drawings, in which:

FIG. 1 is a perspective of the article accumulator of the present invention shown connected to a box dumper for operation therewith and viewed at the left side and the rear from above the article accumulator.

FIG. 2 is a fragmentary view showing a detail of FIG. 1 at an enlarged scale.

FIG. 3 is an enlarged medial longitudinal section taken vertically through the article accumulator of FIG. 1 and including a fragmentary portion of the box dumper with the accumulator in an operational position following that shown in FIG. 1.

FIG. 4 is a transverse section of the article accumulator taken along the lines 4—4 of FIG. 3 showing the accumulator in the FIG. 1 position and at a still further enlarged scale.

FIGS. 5, 6 and 7 are diagrammatic longitudinal views showing the article accumulator of the invention in successive operational positions following that shown in FIG. 3.

With particular reference to FIG. 1 the article accumulator 10 of the present invention is illustrated in operative association with a box dumper 12 similar to the dumper which is the subject of Patent No. 2,901,136 of W. C. Belk et al., for "Box Handling Device." Filled boxes 14 which are to be handled singly by the dumper 12 are delivered by a constantly operating supply conveyor 16, from a source not shown, to the accumulator 10 and onto a slowly moving primary conveyor 18 thereof (FIG. 3) that is driven continuously by the dumper 12. If the accumulator 10 is empty of boxes (FIG. 1) the primary conveyor 18, which is resiliently mounted for vertical movement, is releasably retained in a raised position by a latch 20 (FIG. 7).

A secondary conveyor 22 of the accumulator has a fixed position therein and is also constantly driven by the dumper 12 but at a faster rate than that of the primary conveyor 18. When the leading box in the accumulator 10 reaches the secondary conveyor the box will be accelerated (FIG. 7) thus forming a gap between the leading box and the next succeeding box still remaining on the primary conveyor 18. After progressing a short distance along the secondary conveyor 22 the leading box will engage and depress a part of the latch 20 thereby actuating the same to release the primary conveyor 18, for limited downward movement while supporting one or more boxes thereon. Downward movement of the primary conveyor 18 is effective to project an abutment stop 24 (FIG. 3) into the gap, previously mentioned, and in front of any boxes on the primary conveyor 18. The leading box continues to be advanced by the secondary conveyor 22 toward and into the dumper 12 to be emptied thereby. At a particular time in the operating cycle of the dumper 12, after disposal of the leading box the primary conveyor 18 with the boxes supported thereby will be lifted by a lever 26 (FIGS. 1 and 7) and the conveyor 18 will be releasably locked in raised position by the latch 20. Raising of the primary conveyor is effective to retract the abutment stop 24 and release one box 14 adjacent thereto on the primary conveyor 18 for handling in the manner outlined above.

As best understood from FIGS. 1, 3 and 4, the primary conveyor 18 comprises a frame 30 having two transversely spaced side plates 32 and 34, respectively, of elongated rectangular shape. The side plates 32 and 34 are held rigidly in parallel relation by a top plate 36 (FIG. 3) and a cross channel 38. The top plate 36 is somewhat shorter than the side plates 32 and 34 and is fixed to the side plates adjacent their top edges (not shown) centrally thereof while the cross channel 38 is fixed to and extends between the lower corners of the side plates 32 and 34 (FIG. 4) at the inner end of the frame 30.

Endless conveyor chains 40 adjacent opposite sides of the frame 30 are each trained around sprockets 42 and 44 fixed to transverse shafts 46 and 48, respectively, adjacent the inner and outer ends of the frame 30. The shafts 46 and 48 are rotatable in bearings 50 and 52 (FIG. 1), respectively, that are secured to the side plates 32 and 34. The upper flights of the primary conveyor chain 40 are slidably supported in guide channels 56 (FIGS. 1 and 3) extending longitudinally of the frame and fixed to the top plate 36.

Formed in the side plates 32 and 34 adjacent the feed end of the primary conveyor 18 are slots 58, respectively (only one of which is shown), that extend lengthwise of the frame 30. Inwardly directed lips 60 are formed along the upper edges of the slots 58, respectively, for a purpose later to become apparent. The primary conveyor 18 is mounted for vertical pivotal movement as well as limited horizontal sliding movement upon a shaft 62 extending through the slots 58 and fixed in opposed side walls 64 and 66 of a support structure 68 of the accumulator 10.

The accumulator side walls 64 and 66 are spaced laterally from the side plates 32 and 34, respectively, of the primary conveyor 18 (FIG. 4) and are held in such relation by transverse spacers 70 (FIG. 3). Suitable legs 72 are provided at the feed or forward end of the accumulator 10 to support that end for limited vertical adjustment. At the discharge or rear end, the accumulator support structure 68 is securely attached to a cross brace 74 (FIG. 3) of a frame 76 of the box dumper 12.

Toward the rear of the accumulator 10 below the cross channel 38 of the primary conveyor 18 the side walls 64 and 66 (FIG. 4) are provided with vertically disposed sockets 78, respectively, within the accumulator support structure 68. Each socket 78 removably mounts a helical compression spring 80 that engages and presses upward against the cross channel 38 to thereby resiliently support the inner end of the primary conveyor 18. Through the combined action of the pivot shaft 62 and the springs 80, adjacent opposite ends, respectively, of the primary conveyor 18 are retained, when empty of boxes, is retained in substantially horizontal position (FIGS. 1 and 7) and in horizontal alignment with the secondary conveyor 22.

As best understood from FIGS. 1, 2 and 7 the bearings 50 at the rear of the primary conveyor 18 are cylindrical and of large diameter and project laterally from opposite sides of the primary conveyor frame 30 beyond the side walls 64 and 66. In order that the primary conveyor 18 can pivot about the shaft 62 against the counterbalancing action of the springs 80 to the top edges of the accumulator side walls 64 and 66 are vertically slotted as at 82 (only one of the slots 82 is shown, FIGS. 1 and 2) so as to clear the bearings 50.

The previously mentioned secondary conveyor 22 which is located adjacent the rear end of the accumulator 10 comprises two endless chains 90 each of which is trained around sprockets 92 and 94. A shaft 96 to which the sprockets 92 are fixed is journaled in bearings 98 (only one of which is shown, FIG. 1) at the rear of the support structure 68 in the opposite side walls 64 and 66 thereof. The other sprockets 94 of the secondary conveyor 22 are fixed to a shaft 100 that is journaled in opposite bearings 102 (FIG. 4) located inwardly of the support structure from the bearings 98. As best understood from FIGS. 3 and 4, in order to bring the adjacent ends of the primary conveyor 18 and the secondary conveyor 22 as close as possible to each other the spacing of the conveyor chains 90 of the secondary conveyor 22 is less than the spacing of the chains 40 of primary conveyor 18. The pairs of sprockets 92 and 94 are in substantially horizontal alignment and the upper flights of the chains 90 are slidably supported in longitudinally extending guides 104 secured to a top plate 106 (FIG. 4) that is fixed to and extends between the side walls 64 and 66.

As mentioned previously the box dumper 12 with which the accumulator 10 is operatively associated is described in detail in Patent No. 2,901,136. Therefore, the power train of the box dumper 12 will be described only briefly herein. As shown in FIG. 1 a motor 108 of the box dumper 12 drives a variable speed transmission 110 that is coupled in driving relation by a chain 112 to a horizontal drive shaft 114 (FIGS. 1 and 3) that is journaled in the frame 76. Extending in parallel relation to the drive shaft 114 is a countershaft 116 also journaled in the dumper frame 76. The countershaft 116 (FIGS. 3 and 5–7) is selectively driven at a reduced speed by the drive shaft 114 through a constantly operating gear train 118 comprising a gear 119 fixed on the driving end (not shown) of a clutch 120 that is on the shaft 116. The clutch 120 is of a well known, single revolution type and is normally held with its driven end (not shown) out of driving engagement with the shaft 116, by means later to be described, so that the shaft 116 is at rest. The gear train 118, while capable of driving the countershaft 116 at selected times only is connected in driving relation by a chain 122 connected to the driving end (not shown) of the clutch 120 and to the rear shaft 96 of the secondary conveyor 22 so that the chains 90 thereof are constantly driven in the direction of the arrow 124 (FIGS. 1, 3 and 7). A sprocket and chain arrangement 126 connects the forward shaft 100 of the secondary conveyor 22 with the rear shaft 46 of the primary conveyor 18. By means of the sprocket and chain arrangement 126 the chains 40 of the primary conveyor are driven in the direction of the arrow 128 (FIGS. 1, 3 and 7) at a somewhat slower rate than the chains 90 of the secondary conveyor 22. The primary conveyor 18 while driven by the sprocket and chain arrangement 126 can pivot vertically to a limited extent about the shaft 62.

The lever 26 by which the rear end of the primary conveyor 18 is raised from its lower position (FIG. 5) to its upper position (FIG. 7) is in the form of a bell crank that is mounted for pivotal movement by means of a transverse shaft 134 which is supported by the side walls 64 and 66. Two forwardly projecting arms 136 (FIGS. 3 and 4) of the lever 26 are located adjacent opposite sides of the support structure 68 and are loosely connected at their free ends (FIG. 3) to a rod 138 that is received in fixed axial position in downwardly projecting tongues 140 (FIG. 4) on the underside of the cross channel 38 (FIG. 3) of the primary conveyor 18. The other arm 142 of the lever 26 projects toward the rear of the accumulator 10 from the shaft 134 and is provided at its free end with a cam follower roller 144. A single-lobed cam 146 is fixed to the countershaft 116 for rotation therewith for the purpose of engaging the follower 144 and pivoting the lever 26. Thus, if boxes are on the primary conveyor 18, the rear end of the conveyor will be raised at a particular time in relation to a box emptying operation performed by the dumper 12 if the primary conveyor 18 has been previously lowered by a box against the force of the springs 80.

The abutment stop 24 (FIGS. 1–4) comprises a cross bar 148 disposed transversely of the accumulator 10 at a location between the rear end of the primary conveyor 18 and the forward end of the secondary conveyor 22. The cross bar 148 is provided with two arms 150, one adjacent each end (FIGS. 2 and 4), that project in a direction normal to the bar 148 and are pivotally mounted intermediate their ends upon studs 152 (only one of which is shown FIG. 2) of opposite mounting brackets 154 (FIG. 4). Suitable bolts 156 (FIGS. 2 and 4) in the side walls 64 and 66 of the support structure 68 are received in slots 157 (FIG. 2) in the mounting brackets 154 in order to permit adjustment of the height of the studs 152 on which the supporting arms of the abutment stop 24 are pivoted. When the primary conveyor 18 is in raised position the abutment stop 24 is drawn rearward and downward into retracted position (FIGS. 1, 2 and 7) by tension springs 160 each of which is stretched between the upper end of one of the arms 150 and the side wall 64 or 66, as the case might be.

It will be noted that the lower or free ends of the arms 150 beyond the studs 152 are bent so as to underlie and engage the rear bearings 50 of the primary conveyor when the same is in raised position and the abutment stop is retracted. Thus, it follows that when the primary conveyor 18 is weighted with one or more boxes 14 and is released from raised position (FIGS. 1 and 7) for movement to lowered position (FIGS. 3 and 5) the bearings 50 act as cams against the free ends of the abutment stop arms 150 to pivot the same about the studs 152 and project the stop 24 upward and forward to its operative position. When the stop 24 is in projected position (FIG. 6) a surface 162 of the cross bar 148 is above and substantially normal to the plane of the upper flights of the primary conveyor chains 40 and consequently lies directly in the path of the boxes thereon. When the primary conveyor is in lowered position engagement of the arms 150 of the stop 24 with the bearings 50 positively prevents movement of any box on the primary conveyor past the stop 24. Thus, advancement of a box onto the secondary conveyor is positively prevented until the primary conveyor is raised and the stop 24 is retracted. The surface 162 of the cross bar 148 with which the boxes came into contact is smooth and flat and prevents damage to the boxes upon engagement therewith. Since the adjacent ends of the primary conveyor 18 and the secondary conveyor 22 are so close together (FIG. 2) notches 164 (FIG. 4) are provided in the cross bar 148 of the stop 24 to prevent interference thereof with the movement of the conveyor chains 40 and 90 and the sprocket and chain arrangement 126 which interconnects the two conveyors 18 and 22.

The latch 20 (FIGS. 3 and 5–7) by which the primary conveyor 18 is releasably held in raised position is located rearwardly of the primary conveyor 18 and comprises an arm 166 that is pivotally mounted at its lower end substantially mid-way between the side walls 64 and 66 (FIG. 4) by means of a transverse rod 168 that is supported thereby. At the upper end of the latch arm 166 is a rearwardly and upwardly projecting actuating finger 170. The latch is constantly urged toward the primary conveyor 18 by a tension spring 172 that is stretched between the arm 166 and the underside of the primary conveyor top plate 36.

In order that the latch 20 can retain the primary conveyor 18 in raised position the latch arm 166 is provided about mid-way of its length with a transverse stud shaft 174 (FIG. 4) that rotatably mounts a small diameter roller 176 adjacent each end. The primary conveyor 18 when raised either by the action of the lever 26 or by the springs 80 is held in such raised position (FIG. 7) by the latch 20 that is drawn by the latch spring 172 toward the primary conveyor so that the rollers 176 are moved in beneath the cross channel 38 of the primary conveyor. With the latch 20 holding the primary conveyor 18 raised the free end of the latch actuating finger 170 projects substantially vertically through an aperture 178 (FIGS. 1, 3 and 4) in the top plate 106 and into the path of a box advancing onto the secondary conveyor 22. As a box 14 on the secondary conveyor 22 is moved by the conveyor chains 90 in the direction of the arrow 124 this box engages and depresses the latch actuating finger 170. The latch 20 is thus moved in a counterclockwise direction (FIG. 3) against the tension of the spring 172 until the rollers 176 are moved from beneath the primary conveyor 18 and the same is released for downward movement.

The springs 80 associated with the primary conveyor 18 are of such strength as to return the primary conveyor 18 to, and to hold the same in, raised position when the same is empty of boxes. The springs 80 thus assure that at such times the conveyor 18 will be sufficiently raised so that the latch 20 will be drawn by the spring 172 into primary conveyor retaining position. If boxes enter the accumulator 10 at such a rate that the capacity of the box dumper is not exceeded, such boxes will be uninterruptedly advanced by the accumulator 10 to the box dumper 12 even though the latch 20 is tripped each time a box moves along the secondary conveyor. If a plurality of boxes enter the accumulator 10 in such rapid succession that operation of the dumper would be impaired unless some of them are temporarily delayed, the leading box will be uninterruptedly advanced to the box dumper 12, but the boxes following the leading box will be held on the primary conveyor 18 by the action of the leading box upon engagement thereof with the actuating finger 170 to depress the same and trip the latch 20.

*Operation*

With the motor 108 of the box dumper 12 running, the drive shaft 114 rotates continuously, thereby driving both the primary conveyor 18 and the secondary conveyor 22 by means of the gear train 118 and the chain 122. Let it be assumed that no boxes are in either the box dumper 12 or in the accumulator 10 but that three closely spaced boxes 14a, 14b and 14c (FIG. 1) are being advanced by the feed conveyor 16 to the accumulator 10. Since there are no boxes in the accumulator the primary conveyor 18 will be in raised position where it will be releasably retained by means of the latch 20. The free end of the latch actuating finger 170 projects above the secondary conveyor 22 and the abutment stop 24 is retracted.

The three boxes 14a, 14b, and 14c, as they enter the accumulator 10 are advanced by the chains 40 of the primary conveyor 18 in the direction of the arrow 128.

When the three boxes have moved far enough for the leading box 14a to be engaged for advancement by the chains 90 of the faster moving secondary conveyor 22 the leading box 14a is suddenly accelerated in the direction of the arrow 124. The rapid acceleration of the box 14a causes a gap to be formed between the box 14a on the secondary conveyor 22 and the next succeeding box 14b, which is still on the primary conveyor 18. Approximately simultaneously with the formation of the gap between the boxes 14a and 14b the box 14a trips the latch 20 (FIG. 3) by engaging and depressing the actuating finger 170 thereof. When the latch 20 is tripped the rollers 176 thereof are withdrawn from beneath the cross channel 38 of the primary conveyor 18, and the weight of the boxes 14b and 14c on the primary conveyor 18 is then effective to pivot the conveyor 18 downward about the shaft 62 against the upward resilient force of the springs 80.

As the primary conveyor 18 pivots downward under the weight of the boxes 14b and 14c the bearings 50 cam the arms 150 of the stop 24 in a clockwise direction about the studs 152, thereby projecting the stop 24 (FIG. 3) into the path of the box 14b. The boxes 14b and 14c are thus positively retained on the primary conveyor 18 by the stop 24 while the box 14a continues to be advanced by the secondary conveyor 22 to the box dumper 12 for emptying.

The downward movement of the primary conveyor 18 causes the lever 26 to pivot about the axis of the shaft 134, thus moving the cam follower close to the countershaft 116 of the box dumper and into the path of the cam 146.

When the box 14a is fully advanced into the box dumper by the secondary conveyor 22 the box 14a is stopped in its forward progress by engagement with a drum 184 (FIG. 5) of a box lifting assembly 185. As is more fully explained in the aforesaid Belk Patent No. 2,901,136, the drum 184 is disposed across the path of boxes entering the box dumper 12 and is fixed to a shaft 186 that is journaled in the dumper frame 76. Immediately preceding engagement with the drum 184, the box 14a engages an upwardly projecting arm 188 of an L-shaped clutch actuating or control lever 190 that is pivoted at 192 on the dumper frame 76. The free end of the other arm 194 of the clutch actuating lever 190 is moved by engagement of the box 14a with the arm 188 out of a notch 196 (FIG. 5) in a control disc 198 fixed on the previously mentioned driven end (not shown) of the clutch 120. It should be explained that before the clutch control lever 190 is moved out of engagement with the control disc 198 the driven end of the clutch 120 does not have driven engagement with the countershaft 116, which therefore is stationary.

When the shaft 116 is stationary the cam 146 thereon projects toward the accumulator 10 (FIG. 3) to the right of and above the follower 144 on the lever 26. Upon raising the clutch control lever 190 out of the notch 196 of the clutch control disc 198 the driven and the driving ends of the clutch are engaged with each other and the countershaft 116 is driven by the drive shaft 114 through the gear train 118 for rotation in the direction of the arrow 200 (FIG. 5). Since the clutch control disc 198 rotates with the shaft 116 and the driven end of the clutch 120 and since the disc 198 has only one notch 196 in its periphery the shaft 116 makes one revolution before the actuating lever 194 can again enter the notch 196 to disengage the clutch 120 and stop rotation of the shaft 116. With reference to FIG. 6 and with the foregoing description in mind it may be understood that the cam 146 engages the follower roller 144 and raises the primary conveyor 18 by means of the lever 26 at a time shortly preceding the end of a revolution of the shaft 116 provided, of course, that the conveyor 18 is in a lower position at the time.

Upon pivoting the clutch control lever 190 and iniating rotation of the countershaft 116 the box 14a (FIG. 5) is raised by a table 202 that is part of the box lifting assembly 185. The table 202 is fixed to the drum 184 and projects tangentially from the bottom of the drum horizontally toward the accumulator 10 and is designed to support a box arriving in the dumper and to lift the box during emptying. Referring to FIG. 1 a crank disc 204 (only one of which is shown) is provided on opposite ends of the countershaft 116 for rotation therewith. Links 206 which are rotatably connected to the cranks 204 and to the table 202, respectively, at opposite sides adjacent the free end thereof are effective to pivot the box lifting assembly 185 (FIGS. 5 and 6) once during each revolution of the shaft 116.

As the upwardly moving table 202 of the box lifting assembly 185 engages and raises the box 14a the same is moved in an arcuate path about the axis of the drum shaft 186. During upward movement of the box 14a the arm 188 of the clutch actuating lever 190 is released (FIG. 6) from engagement by the box so that the arm 194 of the lever 190 is free to re-enter the notch 196 upon completion of one revolution of the clutch disc 198. Upward arcuate movement of the box by the box lifting assembly 185 brings the uppermost corner of the box 14a into engagement with an overhead belt 208 that, during operation of the dumper 12, moves constantly in the direction of the arrow 210 (FIGS. 6 and 7). The belt 208 (FIG. 1) is trained about spaced pulleys 212 on shafts 214, respectively, that are journaled in a superstructure 216 in the dumper frame 76. The lower one of the shafts 214 and the drive shaft 114 are interconnected in driving relation by a chain and sprocket arrangement 218 to drive the belt 208.

The constantly moving belt 208, upon engagement by the box 14a, takes over the movement thereof from the box lifting assembly 185 and advances the box during the emptying of the same until the empty box is ultimately discharged from the dumper. The design of the box dumper 12 assures that movement of the box 14a is taken over by the belt 208 from the lifting assembly 185 at a time when the table 202 thereof is fully raised by the cranks 204. Thereafter, the box lifting assembly 185 descends and since the arm 194 of the lever 190 is now free to enter the clutch notch 196 the table 202 continues to descend until such condition exists.

Immediately before the arm 194 drops into the notch 196 the cam 146 on the shaft 116 comes into engagement (FIG. 6) with the previously raised follower 144 of the lever 26 and thereby initiates raising of the primary conveyor 18 on which the boxes 14b and 14c are being retained by the stop 24. As the bearings 50 of the primary conveyor 18 move upward the free ends of the arms 150 of the abutment stop 24 are released and moved by the springs 160 in a counterclockwise direction (FIG. 6) as the stop 24 is retracted.

The latch actuating finger 170 has long since been released by the box 14a and the latch 20 is actuated by the springs 172 so that the latch rollers 176 are prepared to move in beneath the cross channel 38 as soon as the primary conveyor is fully raised (FIGS. 1 and 7). Thereafter, when the primary conveyor 18 is releasably latched in raised position and the stop 24 is fully retracted the lever 190 drops into the notch 196 to disengage the driven end of the clutch from the driving end thereof to disengage the shaft 116 just after the cam 146 passes out of engagement with the follower 144. Rotation of the countershaft 116 is thus stopped while the conveyors 18 and 22 continue movement in the direction of the arrows 128 and 124, respectively, to advance the boxes 14b and 14c. In the manner described in connection with box 14a the boxes 14b and 14c are individually advanced to the box dumper 12 in properly timed relation to the operation thereof.

The distance between the shaft 138 mounted in the tongues 140 of the primary conveyor 18 and the pivot shaft 134 of the lever 26 is fixed by the length of the arms 136 of the lever 26. Since the shaft 138 describes an arc about the axis of the shaft 134 as the rear end of the conveyor is raised or lowered, the primary conveyor 18 experiences a limited horizontal movement at the same time. The lips 60 (FIG. 3) along the upper edges of the slots 58 in the side plates 32 and 34 of the conveyor 18 provide bearings by which the conveyor 18 is slidably as well as rotatably mounted on the shaft 62 so as to permit such horizontal shifting of the conveyor 18.

From the foregoing description it may be understood that all but a single box are positively prevented from moving past the accumulator of the present invention when more than one box is in the accumulator. Moreover, the release of individual boxes from the accumulator 10 is brought about by the machine with which the accumulator is operatively associated, because raising of the primary conveyor 18 to box discharging position and lowering of the box stop 24 are dependent upon completion of almost a full operating cycle of the box dumper, so that when, and only when the operation of dumping one box is nearly completed, the next succeeding box is released from the accumulator. This is one of the important features of the present invention because it makes the frequency of operation of the accumulator to release a box to be dumped, directly dependent upon the demand for boxes to be dumped by the dumping machine 12.

Inasmuch as a wide variety of articles may be handled by the accumulator 10 it is to be particularly understood that the present accumulator may be used with machines other than box dumpers.

While a particular embodiment of the present invention has been shown and described it will be understood that the article handling apparatus of the invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. In an article handling apparatus, a conveyor mounted for vertical movement, a latch arranged to releasably hold said conveyor in a raised position, an actuator located in the path of articles moving from said conveyor so that the articles engage and actuate said latch to release said conveyor for downward movement, and an article stop movably mounted adjacent the discharge end of said conveyor and arranged to be moved by said conveyor into the path of articles on said conveyor when the conveyor moves downward.

2. In an article handling apparatus, a conveyor mounted for vertical movement, means resiliently supporting said conveyor in raised position, a latch arranged to releasably hold said conveyor in raised position while an article is supported thereon, an actuator operably associated with said latch and having an end located in the path of an article moving from said conveyor so that said article engages and actuates said latch to release said conveyor for downward movement while another article is supported on the conveyor, an article stop pivotally mounted adjacent the discharge end of said conveyor, and means associated with said article stop and arranged to urge the same into engagement with said conveyor so that upon downward movement of said conveyor said article stop is moved into the path of said other article on said conveyor.

3. In an article handling apparatus, a first conveyor arranged for downward movement from a raised position, a second conveyor arranged to receive articles from said first conveyor when the first conveyor is in raised position, a latch associated with said first conveyor and arranged to releasably retain the same in raised position, an actuator connected with said latch and associated with said second conveyor and arranged for movement by an article on said second conveyor to trip said latch and release said first conveyor for downward movement while the first conveyor supports another article, and an article stop arranged to block movement of an article off said first conveyor toward said second conveyor when said first conveyor has moved downward.

4. In an article handling apparatus, a first conveyor arranged for downward movement from a raised position, a second conveyor arranged to receive an article from said first conveyor when said first conveyor is in raised position, a latch associated with said first conveyor and arranged to releasably retain the same in raised position, and an actuator connected with said latch and associated with said second conveyor and arranged for movement by an article on said second conveyor to trip said latch and release said first conveyor for downward movement.

5. In an article handling apparatus, a first conveyor arranged for downward movement from a raised position, resilient means associated with said first conveyor and arranged to urge the same toward raised position, a second conveyor arranged to receive articles from said first conveyor when said first conveyor is in raised position, a latch associated with said first conveyor and arranged to releasably retain the same in raised position, an article stop arranged to block movement of articles off said first conveyor toward said second conveyor when said first conveyor has moved downward from said raised position while said first conveyor is supporting an article, and an actuator connected with said latch and associated with said second conveyor and arranged for movement by an article on said second conveyor to trip said latch and release said first conveyor for downward movement.

6. An article handling apparatus comprising a conveyor mounted for movement between a raised article discharging position and a lowered article retaining position, a movable article stop for retaining articles on said conveyor when the same is lowered under the weight of an article and arranged to be moved to operative article retaining position by said conveyor upon movement of the conveyor to said lowered position, a lever operably associated with said conveyor and arranged to raised said conveyor to article discharging position when the conveyor is weighted by an article, and means disabling said article stop as the conveyor is raised.

7. An article handling apparatus comprising a conveyor mounted for movement between raised and lowered positions, a movable article stop associated with said conveyor and arranged to be moved to operative position by said conveyor upon movement of the conveyor to lowered position to block movement of an article off said conveyor, a lever operably associated with said conveyor and arranged to raise said conveyor, means operable as the conveyor rises for retracting said article stop to release said article for movement from said conveyor, power means, drive means associated with said lever, clutch means interposed between said power means and said lever drive means, and means actuated by an article moving from said conveyor for actuating said clutch.

8. An article handling apparatus comprising a first conveyor arranged to move to and from a raised position, a latch associated with said first conveyor and arranged to releasably retain the same in raised position, a second conveyor arranged to receive articles from said first conveyor when the first conveyor is in raised position, an article stop associated with said first conveyor and arranged to block movement of articles off said first conveyor toward said second conveyor when said first conveyor is moved downward, an actuator connected with said latch and associated with said second conveyor and arranged for movement by an article on said second conveyor to trip said latch and release said first conveyor for downward movement, and means associated with said first conveyor and arranged to move the same into raised position.

9. An article handling apparatus comprising a conveyor mounted for movement between raised and lowered positions, an article stop associated with said conveyor and arranged to be moved to operative position by said conveyor upon movement thereof to lowered position to block movement of an article off said conveyor, a lever operably associated with said conveyor and arranged to raise said conveyor, means operable as the conveyor rises for retracting said article stop to release said article for movement from said conveyor, and means operable for actuating said lever to raise said conveyor.

10. An article handling apparatus comprising a first conveyor arranged for movement to and from a raised position, a latch associated with said first conveyor and arranged to releasably retain the same in raised position, a second conveyor arranged to receive articles from said first conveyor when the first conveyor is in raised position, an article stop associated with said first conveyor and arranged to block movement of articles off said first conveyor toward said second conveyor when said first conveyor is moved downward, an actuator connected with said latch and arranged for movement by an article on said second conveyor to trip said latch to release said first conveyor for downward movement, means associated with said first conveyor and arranged to raise the same into said raised position, drive means operatively associated with said conveyor raising means, and control means operatively associated with said drive means and arranged for movement by an article being advanced by said second conveyor to actuate said conveyor raising means.

11. An article handling apparatus comprising a first conveyor arranged for upward and downward movement, means associated with said first conveyor and arranged to resiliently retain the same in an upper position, a latch associated with said first conveyor and arranged to releasably retain the same in said upper position while an article is supported thereon, a second conveyor arranged to receive articles from said first conveyor when the first conveyor is in said upper position, an article stop associated with said first conveyor and arranged to block movement of an article off said first conveyor toward said second conveyor when said first conveyor moves downward under the weight of an article, an actuator connected with said latch and associated with said second conveyor and arranged for movement by an article on said second conveyor to trip said latch and release said first conveyor for downward movement in response to the weight of an article thereon, and means associated with said first conveyor and arranged to raise the same while an article is supported thereon by said first conveyor.

12. An article handling apparatus comprising a first conveyor arranged for upward and downward movement, resilient means yieldably supporting said first conveyor in a raised position, a latch releasably retaining said first conveyor in said raised position while an article is supported thereon, a second conveyor arranged to receive articles from said first conveyor when said first conveyor is in said raised position, an article stop arranged to block movement of an article off said first conveyor toward said second conveyor when said first conveyor is moved from said raised position, an actuator connected with said latch and arranged for movement by an article on said second conveyor to trip said latch and release said first conveyor for movement in response to the weight of an article thereon, means for raising said first conveyor into said raised position, drive means operatively associated with said conveyor raising means, and control means operatively associated with said drive means and arranged for movement by an article being advanced by said second conveyor to actuate said conveyor raising means.

13. An article handling apparatus comprising a first conveyor arranged for vertical movement, means associated with said first conveyor and arranged to urge the same toward a raised position, latch means associated with said first conveyor and biased into latching engagement with said first conveyor to releasably retain the same in raised position, a second conveyor arranged to receive articles from said first conveyor when the first conveyor is in raised position, an article stop associated with said first conveyor and arranged to block movement of an article off the same toward said second conveyor when said first conveyor is moved downward from raised position, an actuator connected with said latch and arranged for movement by an article on said second conveyor to trip said latch and release said first conveyor for downward movement, and means associated with said first conveyor and arranged to raise the same into latching position.

14. An article handling apparatus comprising a first conveyor arranged for vertical movement, resilient means associated with said first conveyor and arranged to urge the same toward a raised position, latch means associated with said first conveyor and biased into latching position with said first conveyor to releasably retain the same in said raised position, a second conveyor arranged to receive articles from said first conveyor when the first conveyor is in raised position, an article stop associated with said first conveyor and arranged to block movement of articles off the same toward said second conveyor when said first conveyor is moved downward from raised position, an actuator connected with said latch and associated with said second conveyor and arranged for movement by an article on said second conveyor to trip said latch and release said first conveyor for downward movement, means associated with said first conveyor and arranged to raise the same into raised position, drive means operatively associated with said conveyor raising means, and control means operatively associated with said drive means and arranged for movement by an article being advanced by said second conveyor to actuate said conveyor raising means.

15. An article handling apparatus comprising a support structure, a first conveyor pivotally mounted adjacent its intake end on said support structure for upward and downward movement of its discharge end and adapted to advance articles at a certain rate, means in said support structure adjacent the discharge end of said first conveyor and arranged to resiliently support said first conveyor in raised position when empty of articles, a second conveyor in said support structure and arranged to receive articles from said first conveyor when in raised position and advance the articles at a faster rate than said first conveyor to form a gap between two adjacent articles on said first and said second conveyors, respectively, a latch pivoted on said support structure and biased toward said first conveyor and arranged to releasably support said first conveyor in raised position, an article stop pivoted on said support structure adjacent the discharge end of said first conveyor and biased toward retracted position, latch actuating means arranged to be engaged and moved by an article moving on said second conveyor to withdraw said latch from supporting relation with said first conveyor for downward movement while supporting an article, and cam means operatively associated with said first conveyor engaging said article stop and arranged upon downward movement of said first conveyor to project said article stop into said gap between the two adjacent articles to block movement of articles from said first conveyor onto said second conveyor.

16. An article handling apparatus comprising a support structure, a first conveyor pivotally mounted adjacent its intake end in said support structure and adapted to advance articles at a certain rate, means on said support structure adjacent the discharge end of said first conveyor and arranged to resiliently support said first conveyor in raised position when empty of articles, a second conveyor in said support structure and arranged to receive articles from said first conveyor when in raised position and to advance the articles at a faster rate than said first conveyor to form a gap between two adjacent articles on said first and said second conveyors, respectively, a latch pivoted on said support structure and biased toward said first conveyor and arranged to releasably support said first conveyor in raised position when supporting an article, an article stop pivoted on said support structure adjacent the discharge end of said first conveyor and biased toward retracted position, latch actuating means arranged to be engaged and moved by an article moving on said second conveyor to withdraw said latch from supporting relation with said first conveyor to release the same for downward movement by the weight of an article supported thereon, cam means operatively associated with said first conveyor engaging said article stop and arranged to project the same into the gap between the two adjacent articles and block movement of articles from said first conveyor and onto said second conveyor upon downward movement of said first conveyor, and lifting means associated with said first conveyor and arranged to be actuated by an article being discharged from said second conveyor to raise said first conveyor into latching position and release said article stop.

17. In an article handling apparatus, a conveyor mounted for movement from raised to lowered position, a latch arranged to releasably hold said conveyor in said raised position, a latch actuator located in the path of articles moving from said conveyor and arranged to be engaged by an article to actuate said latch to release said conveyor for downward movement, and an article stop mounted adjacent the discharge end of said conveyor and positioned in the path of articles on said conveyor when the conveyor is in lowered position.

18. In an article handling apparatus, a conveyor mounted for vertical movement, means yieldably urging said conveyor toward a raised position, a latch associated with said conveyor and arranged to releasably retain the same in raised position, and an actuator connected to said latch and located in the path of articles moving from said conveyor so that one of the articles engages said actuator to actuate said latch for releasing said conveyor for downward movement.

References Cited in the file of this patent

UNITED STATES PATENTS

| | | |
|---|---|---|
| 2,638,203 | Mayer | May 12, 1953 |
| 2,794,534 | Forrester | June 4, 1957 |

FOREIGN PATENTS

| | | |
|---|---|---|
| 434,818 | Germany | Oct. 2, 1926 |
| 602,736 | Germany | Sept. 15, 1934 |